M. PALEN & D. SEXTON.
AQUARIUM.

No. 192,595. Patented July 3, 1877.

Witnesses
Geo. H. Strong
O. T. Stacy

Inventors
Matthew Palen and
Daniel Sexton
By Dewey & Co.
Attys.

UNITED STATES PATENT OFFICE.

MATTHEW PALEN AND DANIEL SEXTON, OF SAN BERNARDINO, CAL.

IMPROVEMENT IN AQUARIUMS.

Specification forming part of Letters Patent No. 192,595, dated July 3, 1877; application filed April 13, 1877.

*To all whom it may concern:*

Be it known that we, MATTHEW PALEN and DANIEL SEXTON, of the town and county of San Bernardino, and State of California, have invented an Improved Aquarium; and we do hereby declare the following to be a full, clear, and exact description thereof, reference being had to the accompanying drawings.

Our invention consists in constructing aquariums in such a manner that a portion of the water can be raised into a chamber or chambers which extend above the level of the water in the main tank or tanks, and sustained there by atmospheric pressure, so that the fish of the aquarium can pass from the main tank into this elevated chamber and back again at will.

Our invention can be applied in a great variety of ways, so as to produce mysterious and illusory effects. For the purpose of this application, however, we have mainly represented its application to a double tank, and in connection with a bird-cage.

Figure 1:
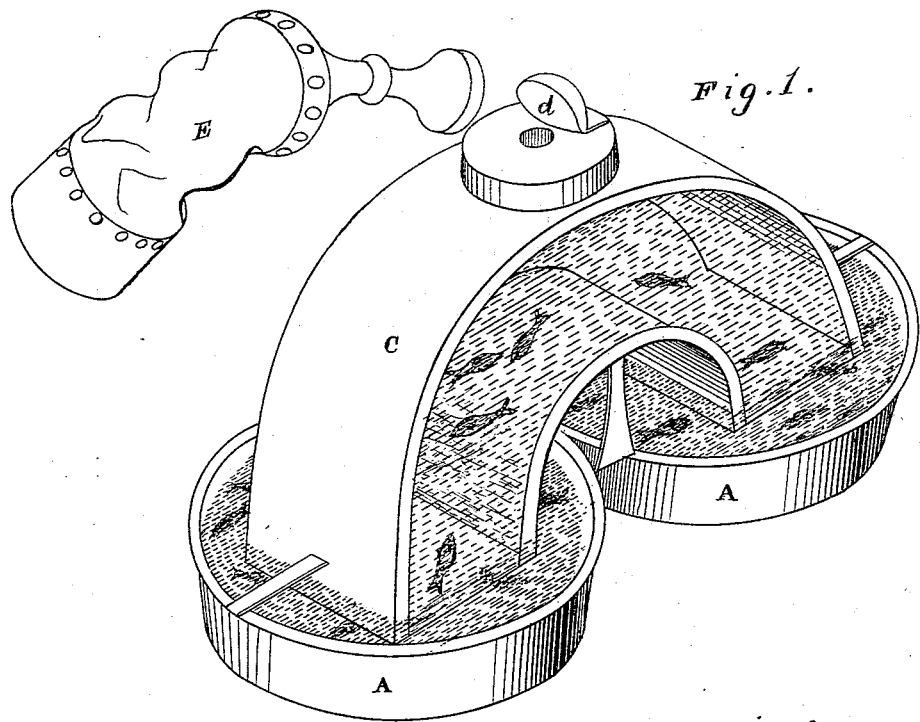
Figure 2:
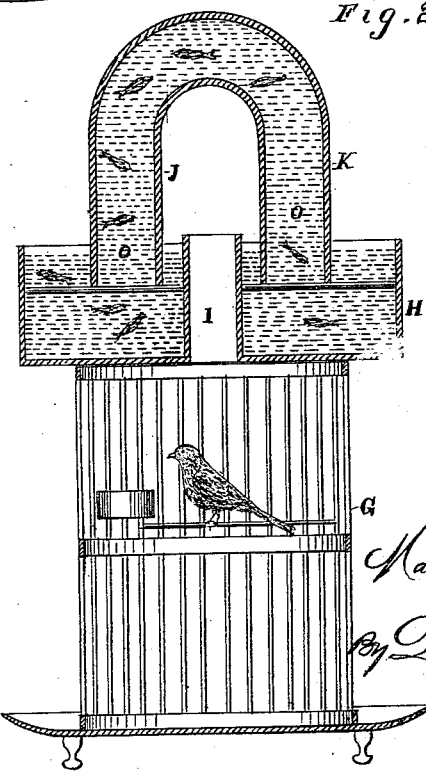

Referring to the accompanying drawings, Figure 1 is a perspective view. Fig. 2 is a sectional view, showing combination with a bird-cage.

Let A A represent two tanks, reservoirs, or vessels of an aquarium, which can be located at any desired distance apart. C is an arched or siphon-shaped chamber, the opposite sides of which are made of glass, and the ends of which are open. This arched or siphon-shaped chamber we arrange so that it will connect the two tanks A A in the manner of a bridge, and it is supported so that each of its open ends terminates inside of one of the tanks. In the top of this arched or semicircular chamber we place a valve, *d*, at the highest point, and provide means for attaching an air-pump, E, over it, so that, when sufficient water is admitted into the tanks or reservoirs A A to cover the ends of the curved chamber, the air in said chamber can be exhausted through the valve *d* by means of the pump E, so that the atmospheric pressure upon the water in the tanks A A will force it up into and fill the curved chamber. The pump can then be removed, and a perfect semicircular column of water will be maintained in the arch, into and through which the fish can pass from one tank or reservoir to the other, thus producing a peculiar and interesting effect.

This same device can be used in a single tank, if desired, the only necessity being that the open ends of the curved or other shaped chamber be submerged below the surface of the water in the tank. This column of water will be thus maintained for a long time, and, where fresh water is continually supplied to either tank, a circulation will be established through the arched chamber which will keep it fresh.

Another adaptation of our invention is shown at Fig. 2, in which we have represented a very unique combination of this principle with a bird-cage, as follows: G is a bird-cage, upon which we construct a tank or vessel, H. I is a central opening, which leads up from the bird-cage through the center of the pan or vessel H. The walls of this central opening are as high as the outside walls or rim of the pan or vessel. Over this central opening we place a bell-shaped glass or receiver, J, which is somewhat larger in diameter than the opening I, and which is supported at such a height from the bottom of the pan or vessel H that the water will rise above its lower edge. Outside of this receiver we place another receiver, K, of larger diameter, which is similarly supported, so that the space O between the two will form a bell-shaped chamber, as represented, while the interior of the smaller receiver J communicates through the passage I with the bird-cage.

Before filling the pan or reservoir H with water we place one end of an elastic or other tube in the space between the two receivers, so that it will terminate at the highest part of the space. The opposite end of the tube is connected with an air-pump outside of the receivers, so that when the pan H has been filled until the water stands above the lower edges of the receiver the air can be exhausted from the bell-shaped chamber and the water raised by atmospheric pressure, so as to fill the space O between the two receivers. The tube can then be withdrawn. The fish in the vessel or tank H can then pass up into the space O between the two receivers, and swim around at pleasure, while the birds in the cage can rise through the passage I into the inside receiver, and thus give the semblance of birds playing with the fish, as the water will not rise above the walls of the opening l.

Thus and in various other ways we are able to apply our invention so as to give peculiar and apparently mysterious effects.

Having thus described our invention, what we claim, and desire to secure by Letters Patent, is—

1. The combination, with an aquarium tank or tanks or reservoir, of an elevated communicating chamber, C, in which the water is sustained by atmospheric pressure, and which forms a passage for the fish, substantially as herein shown and described.

2. The open-bottom chamber C, arranged to have its lower open ends submerged in water, and provided with the valve $d$ and pump E, or their equivalent, whereby the air in the chamber can be exhausted, so as to fill said chamber with water by atmospheric pressure, substantially as and for the purpose described.

In witness whereof we have hereunto set our hands and seals.

MATTHEW PALEN. [L. S.]
   DANIEL SEXTON. [L. S.]

Witnesses to signature of Matthew Palen:
 O. T. STACY,
 F. A. BROOKS.

Witnesses to signature of Daniel Sexton:
 A. SWIFT,
 L. W. TALBOTT.